(12) United States Patent
Yan et al.

(10) Patent No.: US 11,398,092 B2
(45) Date of Patent: Jul. 26, 2022

(54) PARKING DETECTION METHOD AND DEVICE BASED ON VISUAL DIFFERENCE

(71) Applicant: INTELLIGENT INTER CONNECTION TECHNOLOGY CO., LTD., Zhangjiakou (CN)

(72) Inventors: Jun Yan, Beijing (CN); Lin Hou, Beijing (CN)

(73) Assignee: INTELLIGENT INTER CONNECTION TECHNOLOGY CO., LTD., Zhangjiakou (CN)

( * ) Notice: Subject to any disclaimer, the term of this patent is extended or adjusted under 35 U.S.C. 154(b) by 0 days.

(21) Appl. No.: 17/425,330

(22) PCT Filed: Nov. 26, 2020

(86) PCT No.: PCT/CN2020/131818
§ 371 (c)(1),
(2) Date: Jul. 23, 2021

(87) PCT Pub. No.: WO2021/223418
PCT Pub. Date: Nov. 11, 2021

(65) Prior Publication Data
US 2022/0044025 A1    Feb. 10, 2022

(30) Foreign Application Priority Data
May 7, 2020    (CN) .......................... 202010377419.4

(51) Int. Cl.
*G06T 7/73*    (2017.01)
*G06V 20/40*    (2022.01)
(Continued)

(52) U.S. Cl.
CPC .............. *G06V 20/46* (2022.01); *G06N 3/08* (2013.01); *G06T 7/74* (2017.01); *G06V 20/52* (2022.01);
(Continued)

(58) Field of Classification Search
CPC ........ G08G 1/0175; G08G 1/04; G08G 1/147; G08G 1/017; G06V 20/46; G06V 20/52;
(Continued)

(56) References Cited

U.S. PATENT DOCUMENTS

| 2014/0266803 A1* | 9/2014 | Bulan | ...................... G08G 1/04 340/932.2 |
| 2014/0375804 A1* | 12/2014 | Bulan | .................... G06V 20/52 348/148 |

(Continued)

FOREIGN PATENT DOCUMENTS

| CN | 110163107 A | 8/2019 |
| CN | 110490117 A | 11/2019 |

(Continued)

*Primary Examiner* — Ian L Lemieux (57) ABSTRACT

A parking detection method based on visual difference includes: obtaining a video frame of a predetermined monitoring area captured by each camera in real time, and labeling the video frame corresponding to each camera with time information of a current moment; determining vehicle information of a to-be-detected vehicle in each video frame labeled with the time information through a predetermined convolutional neural network model; determining feature point information of the to-be-detected vehicle in each video frame according to the vehicle information of the to-be-detected vehicle in each video frame; calculating a position relationship between the to-be-detected vehicle in each video frame and respective corresponding camera, and constructing current three-dimensional coordinates of the to-be-detected vehicle according to the position relationship; and determining a parking status of the to-be-detected vehicle according to the current three-dimensional coordinates of the to-be-detected vehicle. A parking detection device based on visual difference is further provided.

10 Claims, 2 Drawing Sheets

(51) Int. Cl.
*G06V 20/52* (2022.01)
*G06N 3/08* (2006.01)
*G08G 1/017* (2006.01)

(52) U.S. Cl.
CPC .... *G08G 1/017* (2013.01); *G06T 2207/10016* (2013.01); *G06T 2207/20081* (2013.01); *G06T 2207/20084* (2013.01); *G06T 2207/30232* (2013.01); *G06T 2207/30252* (2013.01); *G06V 2201/08* (2022.01)

(58) Field of Classification Search
CPC .................. G06V 2201/08; G06T 7/74; G06T 2207/10016; G06T 2207/20081; G06T 2207/20084; G06T 2207/30232; G06T 2207/30252; G06N 3/08
See application file for complete search history.

(56) References Cited

U.S. PATENT DOCUMENTS

| | | | |
|---|---|---|---|
| 2016/0163119 A1* | 6/2016 | Bashani | G07B 15/02 705/13 |
| 2017/0161961 A1* | 6/2017 | Salsberg | H04N 7/183 |
| 2019/0050634 A1* | 2/2019 | Nerayoff | G06Q 30/0284 |
| 2020/0349617 A1* | 11/2020 | Rosas-Maxemin | G06Q 50/30 |

FOREIGN PATENT DOCUMENTS

| | | |
|---|---|---|
| CN | 110491168 A | 11/2019 |
| CN | 110532891 A | 12/2019 |
| CN | 111739335 A | 10/2020 |
| JP | 2010271876 A | 12/2010 |
| WO | WO-2020173022 A1 * | 9/2020 |

* cited by examiner

PARKING DETECTION METHOD AND DEVICE BASED ON VISUAL DIFFERENCE

CROSS REFERENCE TO THE RELAYED APPLICATIONS

This application is the national phase entry of International Application No. PCT/CN2020/131818, filed on Nov. 26, 2020, which is based upon and claims priority to Chinese Patent Application No. 202010377419.4, filed on May 7, 2020, the entire contents of which are incorporated herein by reference.

TECHNICAL FIELD

The present invention relates to the technical field of intelligent parking management, and more particularly, to a parking detection method and device based on visual difference.

BACKGROUND

With the rapid development of the urban economy and the continuous improvement of people's living standards, the number of urban motor vehicles is rapidly growing. Limited parking spaces cause various parking issues for common people. In order to resolve the parking problems, city managers begin to plan parking spaces on the roadside. However, each roadside parking space has multiple entrances and exits. Due to this characteristic of roadside parking, it is difficult to manage the roadside parking spaces.

Currently, there are many solutions about how to effectively manage roadside parking spaces, such as installing a geomagnetic device or a video pole in each parking space, mobile vehicle patrolling, high-position dome cameras, and parallel matrix devices. The roadside parking management is generally initiated by the government. Since it involves time-based pricing for parking, the accuracy of parking events will affect the public credibility of the government. Conventional roadside parking management devices have unavoidable defects or inefficiencies. For example, although the geomagnetic device has a low cost, it is susceptible to interference from ground objects when detecting vehicles, causing inaccurate detection of vehicle entry and exit. In addition, the geomagnetic device cannot recognize license plates, so that manual recording is necessarily combined in use, leading to an extremely low efficiency. For example, the video pole is easily interfered by people due to the low installation position, thus there exists a great risk of evasion in payment fees. As a result, high labor costs are required for supervision and management, and under-reporting may occur in irregular parking conditions. For example, mobile vehicle patrolling not only requires human participation, but also requires a motor vehicle for supervision and management. The most important thing is that vehicle departure after the patrolling cannot be accurately recorded. For example, the high-position dome camera has hardware defects in identification when multiple vehicles enter or exit the field at the same time. The high-position dome camera is prone to produce much under-reporting in the field with heavy traffic volume, hence it is difficult to manage roadside parking effectively and accurately. For example, as regards the parallel matrix device for roadside management, when there are garden trees on the roadside, the branches may block the lens; or in windy weather, the branches shake in front of the lens, which interfere with the detection of the vehicle's entry and exit. In addition, when a large vehicle blocks a smaller vehicle that is parking in front of the large vehicle, under-reporting or false reporting of other vehicles' entry and exit may be generated.

Therefore, it is urgently desirable to develop a method that can accurately detect the status of a vehicle in the existing roadside parking conditions.

SUMMARY

The embodiments of the present invention provide a parking detection method and device based on visual difference, to accurately detect a status of a vehicle.

An embodiment of the present invention provides a parking detection method based on visual difference, including:

obtaining a video frame of a predetermined monitoring area captured by each camera in real time, and labeling the video frame corresponding to each camera with time information of a current moment;

determining vehicle information of a to-be-detected vehicle in each video frame labeled with the time information through a predetermined convolutional neural network model;

determining feature point information of the to-be-detected vehicle in each video frame according to the determined vehicle information of the to-be-detected vehicle in each video frame;

calculating a position relationship between the to-be-detected vehicle in each video frame and respective corresponding camera according to the feature point information, and constructing current three-dimensional coordinates of the to-be-detected vehicle according to the position relationship; and determining a parking status of the to-be-detected vehicle according to the current three-dimensional coordinates of the to-be-detected vehicle.

An embodiment of the present invention provides a parking detection device based on visual difference, including:

an acquisition and labeling module, configured to obtain a video frame of a predetermined monitoring area captured by each camera in real time, and label the video frame corresponding to each camera with time information of a current moment;

a first determining module, configured to determine vehicle information of a to-be-detected vehicle in each video frame labeled with the time information through a predetermined convolutional neural network model;

a second determining module, configured to determine feature point information of the to-be-detected vehicle in each video frame according to the determined vehicle information of the to-be-detected vehicle in each video frame;

a calculation and construction module, configured to calculate a position relationship between the to-be-detected vehicle in each video frame and respective corresponding camera according to the feature point information, and construct current three-dimensional coordinates of the to-be-detected vehicle according to the position relationship; and a third determining module, configured to determine a parking status of the to-be-detected vehicle according to the current three-dimensional coordinates of the to-be-detected vehicle.

The above technical solutions have the following advantages. According to the present invention, a video frame of a predetermined monitoring area captured by each camera in real time is obtained, and the video frame corresponding to each camera is labeled with time information of a current moment, so that detection can be performed on a vehicle in time, and missed detection for the vehicle is reduced. Feature point information of a to-be-detected vehicle in each video frame is determined, a position relationship between the to-be-detected vehicle in each video frame and respective corresponding camera is calculated, and current three-dimensional coordinates of the to-be-detected vehicle are constructed according to the position relationship. In this way, camera-based spatial position information of the vehicle is accurately obtained according to the principle of visual difference, which provides important prerequisites for the subsequent determining status of the vehicle. A parking status of the to-be-detected vehicle is determined according to the current three-dimensional coordinates of the to-be-detected vehicle, so that the status of the vehicle is accurately determined according to the spatial position information of the vehicle, and the efficiency and accuracy of vehicle detection are greatly improved. Further, parking management gets rid of dependence on the conventional vehicle management device, and vehicle management can be performed reliably, accurately, and efficiently without being affected by the surrounding environment. Further, the cost of parking management is saved.

BRIEF DESCRIPTION OF THE DRAWINGS

To describe the technical solutions in the embodiments of the present invention or in the prior art more clearly, the drawings required for describing the embodiments or the prior art will be briefly described below. Apparently, the drawings in the following description show merely some embodiments of the present invention, and a person of ordinary skill in the art may still derive other drawings from these drawings without creative efforts.

DETAILED DESCRIPTION OF THE EMBODIMENTS

The technical solutions of the embodiments of the present invention are clearly and completely described below with reference to the drawings. Apparently, the described embodiments are merely a part, rather than all, of the embodiments of the present invention. All other embodiments obtained by a person of ordinary skill in the art based on the embodiments of the present invention without creative efforts shall fall within the protection scope of the present invention.

Figure 1:
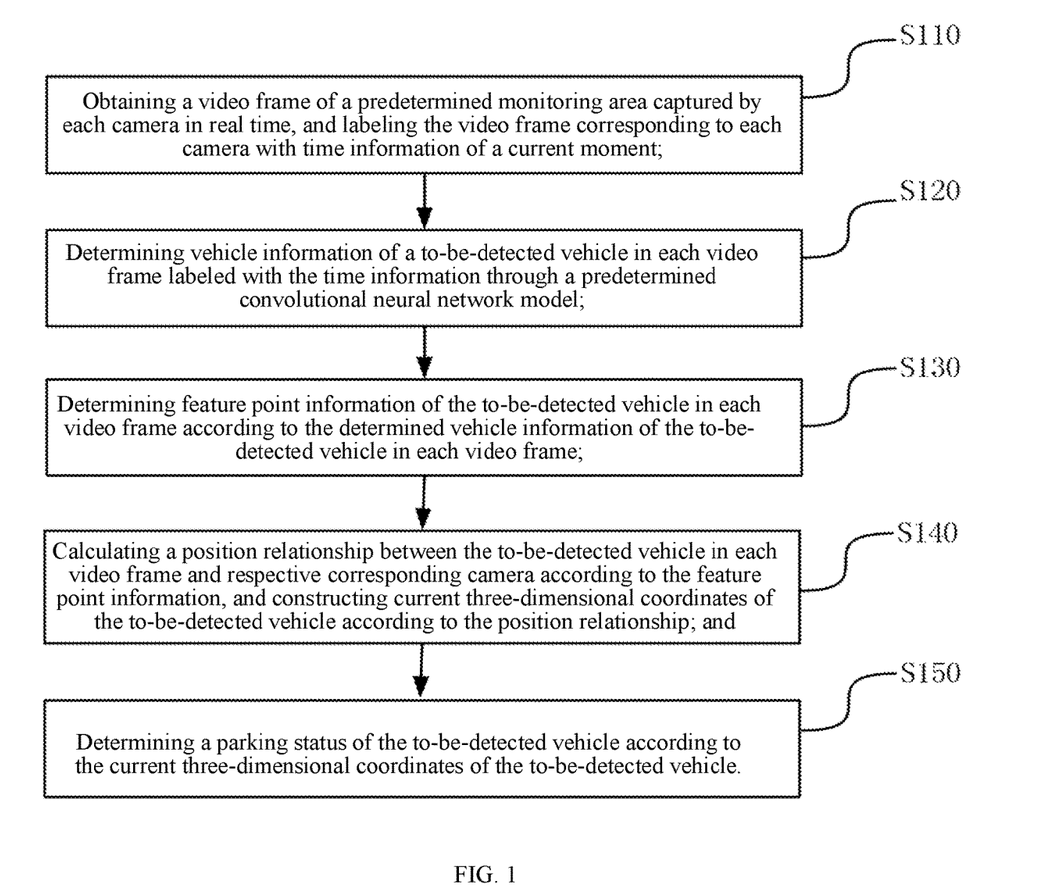
FIG. 1 is a flowchart of a parking detection method based on visual difference according to an embodiment of the present invention.

FIG. 1 is a flowchart of a parking detection method based on visual difference according to an embodiment of the present invention, including the following steps.

Step 110: a video frame of a predetermined monitoring area captured by each camera in real time is obtained, and the video frame corresponding to each camera is labeled with time information of a current moment.

Step 120: vehicle information of a to-be-detected vehicle in each video frame labeled with the time information is determined through a predetermined convolutional neural network model.

Step 130: feature point information of the to-be-detected vehicle in each video frame is determined according to the determined vehicle information of the to-be-detected vehicle in each video frame.

Step 140: a position relationship between the to-be-detected vehicle in each video frame and respective corresponding camera is calculated according to the feature point information, and current three-dimensional coordinates of the to-be-detected vehicle are constructed according to the position relationship.

Step 150: a parking status of the to-be-detected vehicle is determined according to the current three-dimensional coordinates of the to-be-detected vehicle.

Further, the step of determining the vehicle information of the to-be-detected vehicle in each video frame labeled with the time information through the predetermined convolutional neural network model specifically includes:

in each video frame labeled with the time information, based on each video frame, performing full-frame detection on a vehicle for a current video frame through the predetermined convolutional neural network model to obtain the vehicle information of the to-be-detected vehicle, where the vehicle information includes the feature point information of the vehicle.

Further, the step of calculating the position relationship between the to-be-detected vehicle in each video frame and respective corresponding camera according to the feature point information includes:

performing a comparison on identical feature points of the to-be-detected vehicle in all video frames through a principle of visual difference based on the feature point information of the to-be-detected vehicle in all the video frames;

determining position information of each feature point in respective video frame after the comparison; and calculating, based on the position information, a distance between each feature point and a camera capturing a video frame of respective feature point.

Further, after the step of calculating, based on the position information, the distance between each feature point and the camera capturing the video frame of the respective feature point, the parking detection method includes:

determining a feature point with a maximum distance and a feature point with a minimum distance based on all distances; and the step of constructing the current three-dimensional coordinates of the to-be-detected vehicle according to the position relationship includes:

constructing the current three-dimensional coordinates of the to-be-detected vehicle according to the determined feature point with the maximum distance and the determined feature point with the minimum distance.

Optionally, the step of determining the parking status of the to-be-detected vehicle according to the current three-dimensional coordinates of the to-be-detected vehicle further includes:

determining whether the to-be-detected vehicle is blocked according to the current three-dimensional coordinates of the to-be-detected vehicle; and determining the parking status of the to-be-detected vehicle if the to-be-detected vehicle is not blocked.

Further, the parking detection method includes:

determining any one camera as a primary camera.

Further, the step of determining whether the to-be-detected vehicle is blocked according to the current three-dimensional coordinates of the to-be-detected vehicle includes:

determining the time information based on the constructed current three-dimensional coordinates of the to-be-detected vehicle, and obtaining contrasted three-dimensional coordinates of the to-be-detected vehicle at a previous moment of the time information according to the time information;

for each feature point, determining whether a position of a current feature point of the to-be-detected vehicle in the current three-dimensional coordinates is consistent with a position of the current feature point of the to-be-detected vehicle in the contrasted three-dimensional coordinates;

if the position of the current feature point of the to-be-detected vehicle in the current three-dimensional coordinates is not consistent with the position of the current feature point of the to-be-detected vehicle in the contrasted three-dimensional coordinates, determining a current distance between the current feature point in the current three-dimensional coordinates and the primary camera according to a position of the current three-dimensional coordinates, and determining a contrasted distance between the current feature point in the contrasted three-dimensional coordinates and the primary camera according to a position of the contrasted three-dimensional coordinates; and determining whether the to-be-detected vehicle is blocked according to the current distance and the contrasted distance.

Further, the step of determining whether the to-be-detected vehicle is blocked according to the current distance and the contrasted distance includes:

if the current distance is not smaller than the contrasted distance, determining that the to-be-detected vehicle is not blocked; and if the current distance is smaller than the contrasted distance, determining that the to-be-detected vehicle is blocked.

Figure 2:
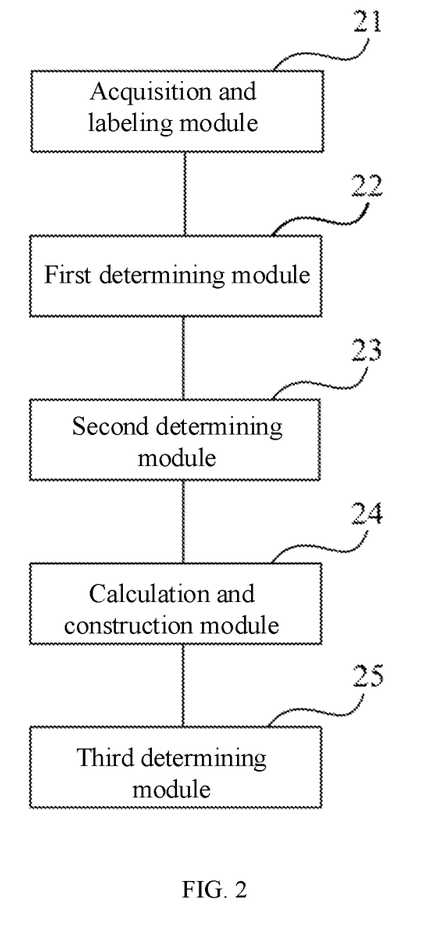
FIG. 2 is a schematic diagram of the structure of a parking detection device based on visual difference according to an embodiment of the present invention.

FIG. 2 is a schematic structural diagram of a parking detection device based on visual difference according to an embodiment of the present invention, including:

the acquisition and labeling module 21, configured to obtain a video frame of a predetermined monitoring area captured by each camera in real time, and label the video frame corresponding to each camera with time information of a current moment;

the first determining module 22, configured to determine vehicle information of a to-be-detected vehicle in each video frame labeled with the time information through a predetermined convolutional neural network model;

the second determining module 23, configured to determine feature point information of the to-be-detected vehicle in each video frame according to the determined vehicle information of the to-be-detected vehicle in each video frame;

the calculation and construction module 24, configured to calculate a position relationship between the to-be-detected vehicle in each video frame and respective corresponding camera according to the feature point information, and construct current three-dimensional coordinates of the to-be-detected vehicle according to the position relationship; and the third determining module 25, configured to determine a parking status of the to-be-detected vehicle according to the current three-dimensional coordinates of the to-be-detected vehicle.

Further, the first determining module is specifically configured to:

in each video frame labeled with the time information, based on each video frame, perform full-frame detection on a vehicle for a current video frame through the predetermined convolutional neural network model to obtain the vehicle information of the to-be-detected vehicle, where the vehicle information includes the feature point information of the vehicle.

Further, the calculation and construction module includes:

a comparison unit, configured to perform a comparison on identical feature points of the to-be-detected vehicle in all video frames through a principle of visual difference based on the feature point information of the to-be-detected vehicle in all the video frames;

a first determining unit, configured to determine position information of each feature point in respective video frame after the comparison; and a calculation unit, configured to calculate, based on the position information, a distance between each feature point and a camera capturing a video frame of respective feature point.

Further, the calculation and construction module includes:

a second determining unit, configured to determine a feature point with a maximum distance and a feature point with a minimum distance based on all distances; and a construction unit, configured to construct the current three-dimensional coordinates of the to-be-detected vehicle according to the determined feature point with the maximum distance and the determined feature point with the minimum distance.

Optionally, the third determining module further includes:

a judgment unit, configured to determine whether the to-be-detected vehicle is blocked according to the current three-dimensional coordinates of the to-be-detected vehicle; and a third determining unit, configured to determine the parking status of the to-be-detected vehicle if the to-be-detected vehicle is not blocked.

Further, the parking detection device includes:

a fourth determining module, configured to determine any one camera as a primary camera.

Further, the judgment unit is specifically configured to:

determine the time information based on the constructed current three-dimensional coordinates of the to-be-detected vehicle, and obtain contrasted three-dimensional coordinates of the to-be-detected vehicle at a previous moment of the time information according to the time information;

for each feature point, determine whether a position of a current feature point of the to-be-detected vehicle in the current three-dimensional coordinates is consistent with a position of the current feature point of the to-be-detected vehicle in the contrasted three-dimensional coordinates;

if the position of the current feature point of the to-be-detected vehicle in the current three-dimensional coordinates is not consistent with the position of the current feature point of the to-be-detected vehicle in the contrasted three-dimensional coordinates, determine a current distance between the current feature point in the current three-dimensional coordinates and the primary camera according to a position of the current three-dimensional coordinates, and determine a contrasted distance between the current feature point in the contrasted three-dimensional coordinates and the primary camera according to a position of the contrasted three-dimensional coordinates; and determine whether the to-be-detected vehicle is blocked according to the current distance and the contrasted distance.

Further, the judgment unit is specifically configured to:

if the current distance is not smaller than the contrasted distance, determine that the to-be-detected vehicle is not blocked; and if the current distance is smaller than the contrasted distance, determine that the to-be-detected vehicle is blocked.

The above technical solutions of the embodiments of the present invention have the following advantages. According to the embodiments, a video frame of a predetermined monitoring area captured by each camera in real time is obtained, and the video frame corresponding to each camera is labeled with time information of a current moment, so that detection can be performed on a vehicle in time, and missed detection for the vehicle is reduced. Feature point information of a to-be-detected vehicle in each video frame is determined, a position relationship between the to-be-detected vehicle in each video frame and respective corresponding camera is calculated, and current three-dimensional coordinates of the to-be-detected vehicle are constructed according to the position relationship. In this way, camera-based spatial position information of the vehicle is accurately obtained according to the principle of visual difference, which provides important prerequisites for subsequent determining of the status of the vehicle. A parking status of the to-be-detected vehicle is determined according to the current three-dimensional coordinates of the to-be-detected vehicle, so that the status of the vehicle is accurately determined according to the spatial position information of the vehicle, and the efficiency and accuracy of vehicle detection are greatly improved. Further, parking management gets rid of dependence on the conventional vehicle management device, and vehicle management can be performed reliably, accurately, and efficiently without being affected by the surrounding environment. Further, the cost of parking management is saved.

The technical solutions of the embodiments of the present invention are described in detail below with reference to application examples.

The application examples of the present invention are intended to detect a status of a vehicle efficiently and accurately.

As shown in FIG. 1, for example, in a parking management system, at least one camera, such as a camera A and a camera B, is disposed on a roadside video pole or installation pole, and video information of a predetermined monitoring area is captured by each camera in real time. Video frames of the predetermined monitoring area captured by the camera A and the camera B in real time are obtained. If the obtained video frames are captured at 2020-03-03 12:01:34, label information of the video frame captured by the camera A is "A-2020-03-03 12:01:34", and label information of the video frame captured by the camera B is "B-2020-03-03 12:01:34". Then, in each video frame labeled with the time information, vehicle information of a to-be-detected vehicle, such as Car, is determined through a predetermined convolutional neural network model. Feature point information of the to-be-detected vehicle Car in each video frame is determined according to the determined vehicle information of the to-be-detected vehicle Car in each video frame. Feature point, for example, is each wheel of the vehicle. A position relationship between the to-be-detected vehicle Car in the video frame labeled with "A-2020-03-03 12:01:34" and its corresponding camera A, and a position relationship between the to-be-detected vehicle Car in the video frame labeled with "B-2020-03-03 12:01:34" and its corresponding camera B are respectively calculated according to the feature point information, and current three-dimensional coordinates of the to-be-detected vehicle Car are constructed according to the position relationships. Then, a parking status of the to-be-detected vehicle Car is determined according to the current three-dimensional coordinates of the to-be-detected vehicle Car.

It should be noted that a person skilled in the art can understand that the feature points of the vehicle include the wheels, the roof, the rearview mirrors, and others. The parking status of the vehicle includes a vehicle entry state, a vehicle exit state, and a vehicle parking state. Specific examples are used in the embodiments of the present invention for descriptive purposes, but are not limited hereto.

It should also be noted that there is a plurality of cameras in the present invention. Specific examples are used in the embodiments of the present invention for descriptive purposes, but are not limited hereto.

In a possible implementation, the step of determining the vehicle information of the to-be-detected vehicle in each video frame labeled with the time information through the predetermined convolutional neural network model specifically includes: in each video frame labeled with the time information, based on each video frame, performing full-frame detection on a vehicle for a current video frame through the predetermined convolutional neural network model to obtain the vehicle information of the to-be-detected vehicle, where the vehicle information includes the feature point information of the vehicle.

The step of calculating the position relationship between the to-be-detected vehicle in each video frame and respective corresponding camera according to the feature point information includes: performing a comparison on identical feature points of the to-be-detected vehicle in all video frames through a principle of visual difference based on the feature point information of the to-be-detected vehicle in all the video frames; determining position information of each feature point in respective video frame after the comparison; and calculating, based on the position information, a distance between each feature point and a camera capturing a video frame of respective feature point.

For example, in a parking management system, a camera A and a camera B are disposed on a roadside video pole or installation pole, and video information of a predetermined monitoring area is captured by each camera in real time. Video frames of the predetermined monitoring area captured by the camera A and the camera B in real time are obtained. If the obtained video frames are captured at 2020-03-03 12:01:34, label information of the video frame captured by the camera A is "A-2020-03-03 12:01:34", and label information of the video frame captured by the camera B is "B-2020-03-03 12:01:34". Full-frame detection is performed on a vehicle for the video frame labeled with "A-2020-03-03 12:01:34" and the video frame labeled with "B-2020-03-03 12:01:34" through the predetermined convolutional neural network model, to obtain vehicle information of a to-be-detected vehicle, such as Car. The vehicle information includes the feature point information of the vehicle. The feature point information, for example, includes information about each wheel of the vehicle or the middle point between the roof and the near edge of the camera. Then, identical feature points of the to-be-detected vehicle Car in the video frames are compared through the principle of visual difference based on the feature point information of the to-be-detected vehicle Car in the video frame labeled with "A-2020-03-03 12:01:34" and the video frame labeled with "B-2020-03-03 12:01:34". Position information of each feature point in respective video frame after the comparison is determined. A distance between each feature point and a camera capturing a video frame of respective feature point is calculated based on the position information.

In a possible implementation, after the step of calculating, based on the position information, the distance between each feature point and the camera capturing the video frame of the respective feature point, the parking detection method includes: determining a feature point with a maximum distance and a feature point with a minimum distance based on all distances.

The step of constructing the current three-dimensional coordinates of the to-be-detected vehicle according to the position relationship includes: constructing the current three-dimensional coordinates of the to-be-detected vehicle according to the determined feature point with the maximum distance and the determined feature point with the minimum distance.

The step of determining the parking status of the to-be-detected vehicle according to the current three-dimensional coordinates of the to-be-detected vehicle further includes: determining whether the to-be-detected vehicle is blocked according to the current three-dimensional coordinates of the to-be-detected vehicle; and determining the parking status of the to-be-detected vehicle if the to-be-detected vehicle is not blocked.

For example, in the foregoing example, after the distance between each feature point and the camera capturing the video frame of respective feature point is calculated, the feature point with the maximum distance, such as the center of the left front wheel of the vehicle in the video frame captured by the camera A, and the feature point with the minimum distance, such as the middle point between the car roof in the video frame captured by the camera B and the near edge of the camera, are determined. Then, the current three-dimensional coordinates, such as cor10, of the to-be-detected vehicle Car are constructed based on the distance between the camera A and the center of the left front wheel of the vehicle in the video frame "A-2020-03-03 12:01:34" and the distance between the camera B and the middle point between the car roof in the video frame "B-2020-03-03 12:01:34" and the near edge of the camera. Then, it is determined whether the to-be-detected vehicle Car is blocked according to the current three-dimensional coordinates cor10 of the to-be-detected vehicle Car; and if the to-be-detected vehicle Car is not blocked, the parking status of the to-be-detected vehicle Car is determined.

According to this embodiment, by accurately detecting whether the vehicle is blocked, misjudgment of the vehicle entering or exiting the parking space is avoided when branches/leaves block the lens of the camera in windy weather or a relatively large vehicle blocks the front parking space. This can significantly improve the accuracy of roadside parking management and the detection efficiency.

In a possible implementation, the parking detection method may include: determining any camera as a primary camera.

The step of determining whether the to-be-detected vehicle is blocked according to the current three-dimensional coordinates of the to-be-detected vehicle includes: determining the time information based on the constructed current three-dimensional coordinates of the to-be-detected vehicle, and obtaining contrasted three-dimensional coordinates of the to-be-detected vehicle at a previous moment of the time information according to the time information; for each feature point, determining whether a position of a current feature point of the to-be-detected vehicle in the current three-dimensional coordinates is consistent with a position of the current feature point of the to-be-detected vehicle in the contrasted three-dimensional coordinates; if the position of the current feature point of the to-be-detected vehicle in the current three-dimensional coordinates is not consistent with the position of the current feature point of the to-be-detected vehicle in the contrasted three-dimensional coordinates, determining a current distance between the current feature point in the current three-dimensional coordinates and the primary camera according to a position of the current three-dimensional coordinates, and determining a contrasted distance between the current feature point in the contrasted three-dimensional coordinates and the primary camera according to a position of the contrasted three-dimensional coordinates; and determining whether the to-be-detected vehicle is blocked according to the current distance and the contrasted distance.

The step of determining whether the to-be-detected vehicle is blocked according to the current distance and the contrasted distance includes: if the current distance is not smaller than the contrasted distance, determining that the to-be-detected vehicle is not blocked; and if the current distance is smaller than the contrasted distance, determining that the to-be-detected vehicle is blocked.

For example, in a parking management system, any one camera is determined as a primary camera, for example, a camera A is determined as the primary camera. Time information based on the constructed current three-dimensional coordinates cor10 of the to-be-detected vehicle Car is determined to be 2020-03-03 12:01:34 according to the current three-dimensional coordinates cor10 of the to-be-detected vehicle Car. Contrasted three-dimensional coordinates, such as cor09, of the to-be-detected vehicle at a previous moment of 2020-03-03 12:01:34, such as 2020-03-03 12:01:33, are obtained according to the time information. For each feature point, it is determined whether a position of a current feature point of the to-be-detected vehicle Car in the current three-dimensional coordinates cor10 is consistent with a position of the current feature point of the to-be-detected vehicle Car in the contrasted three-dimensional coordinates cor09. If no, a current distance, such as 6 meters, between the current feature point in the current three-dimensional coordinates cor10 and the primary camera A is determined according to the position of the current three-dimensional coordinates cor10, and a contrasted distance, such as 5 meters, between the current feature point in the contrasted three-dimensional coordinates cor09 and the primary camera A is determined according to the position of the contrasted three-dimensional coordinates cor09. It is determined that the current distance is not smaller than the contrasted distance according to the current distance of 6 meters and the contrasted distance of 5 meters, hence it is determined that the to-be-detected vehicle Car is not blocked. If the current distance is smaller than the contrasted distance, it is determined that the to-be-detected vehicle is blocked. In this case, the parking management system may determine that the video frame is an unusable video frame, and will discard the video frame.

In a specific application scenario, in the parking management system, the specific method for determining the parking status of the vehicle according to the current three-dimensional coordinates of the to-be-detected vehicle determined in the foregoing embodiment may further include any of the following:

(1) In the current three-dimensional coordinates, if the center of the bottom plane of the to-be-detected vehicle falls within the any parking space, it is determined that the to-be-detected vehicle enters the parking space.

(2) In the current three-dimensional coordinates, if the center of the bottom plane of the to-be-detected vehicle is located beyond any parking space, it is determined that the to-be-detected vehicle exits the parking space.

In the parking management system, according to the constructed current three-dimensional coordinates, when the center of the bottom plane of the to-be-detected vehicle falls within any parking space, the time at which the to-bedetected vehicle enters the parking space is determined as the current time. In the current three-dimensional coordinates, when the center of the bottom plane of the to-be-detected vehicle is located beyond any parking space, time information based on the constructed current three-dimensional coordinates of the to-be-detected vehicle is determined, and contrasted three-dimensional coordinates of the to-be-detected vehicle at a previous moment of the time information are obtained according to the time information. Then, it is determined whether the center of the bottom plane of the to-be-detected vehicle falls within any parking space in the contrasted three-dimensional coordinates; and if yes, the time at which the to-be-detected vehicle exits the parking space is determined as the current time. For example, according to the constructed current three-dimensional coordinates cor10, if the center of the bottom plane of the to-be-detected vehicle Car falls within any parking space, such as a parking space 001, the time at which the to-be-detected vehicle enters the parking space 001 is determined as the current time: 2020-03-03 12:01:34. In the current three-dimensional coordinates cor10, if the center of the bottom plane of the to-be-detected vehicle is located beyond any parking space, the time information based on the constructed current three-dimensional coordinates of the to-be-detected vehicle Car is determined, and the contrasted three-dimensional coordinates, such as cor09, of the to-be-detected vehicle Car at a previous moment, such as 2020-03-03 12:01:33, of the time information are obtained according to the time information. Then, it is determined whether the center of the bottom plane of the to-be-detected vehicle Car falls within any parking space in the contrasted three-dimensional coordinates cor09; and if yes, the time at which the to-be-detected vehicle Car exits the parking space is determined as the current time: 2020-03-03 12:01:33.

Through this embodiment, the efficiency of roadside parking management can be improved, various parking states of vehicles can be accurately determined, and the accuracy of roadside parking management and the detection efficiency can be further improved.

An embodiment of the present invention provides a parking detection device based on visual difference, which can implement the embodiments of the method provided above. For specific function implementation, refer to the descriptions about the embodiments of the method. Hence, details are not described herein again.

It should be understood that the specific order or hierarchy of steps in the process disclosed is an example of exemplary method. Based upon design preferences, it should be understood that the specific order or hierarchy of steps in the process may be rearranged without departing from the scope of protection of the present invention. The appended claims of the method present elements of the various steps in a exemplary order, and are not meant to be limited to the specific order or hierarchy presented.

In the foregoing detailed description, various features of the present invention are combined together in a single embodiment for the purpose of simplifying the disclosure. This method of invention is not to be interpreted as reflecting an intention that the implementation solutions of the claimed invention requires more features than that are expressly recited in each claim. Instead, as the appended claims reflect, the present invention lie in a state of being less than all features of any single foregoing disclosed embodiment. Thus, the appended claims are hereby clearly incorporated into the detailed description by this reference, with each claim standing on its own as a separate preferred solution of the present invention.

The above description of the disclosed embodiments is provided to enable any person skilled in the art to implement or use the present invention. Various modifications to these embodiments will be obvious to a person skilled in the art, and the generic principles described herein can be applied to other embodiments without departing from the spirit or the scope of protection of the present invention. Thus, the present invention is not to be limited to the embodiments shown, but should be accorded the widest scope consistent with the principles and features described herein.

The foregoing description includes examples of one or more embodiments. Certainly, it is impossible to describe all possible combinations of components or methods in order to describe the foregoing embodiments, but a person of ordinary skill in the art should realize that the embodiments can be further combined and arranged. Thus, the embodiments described in this specification are intended to cover all the changes, modifications, and variations that fall within the protection scope of the appended claims. In addition, with regard to the term "include" used in the specification or claims, the coverage of such word is similar to that of the term "comprise", just as "comprise," is explained as a conjunction in the claims. In addition, any term "or" used in the description of the claims is intended to mean a "non-exclusive or".

A person skilled in the art may further understand that various illustrative logical blocks, units, and steps listed in the embodiments of the present invention may be implemented by electronic hardware, computer software, or a combination of the two. To clearly present the interchangeability between hardware and software, functions of various illustrative components, units, and steps above have been described generally. Whether such functions are implemented by hardware or software depends on the specific application and the design requirement of entire system. A person skilled in the art may use various methods to implement the described functions for each specific application, but such implementation should not be considered to be out of the scope of protection of the embodiments of the present invention.

Various illustrative logical blocks and units described in the embodiments of the present invention may implement or operate the described functions by using a general-purpose processor, a digital signal processor, an application-specific integrated circuit (ASIC), a field-programmable gate array (FPGA) or other programmable logical devices, a discrete gate or transistor logic, a discrete hardware component, or a design of a combination of any of the foregoing items. The general-purpose processor may be a microprocessor. Optionally, the general-purpose processor may be any conventional processor, controller, microcontroller, or state machine. The processor may be implemented by a combination of computing devices, such as, a digital signal processor and a microprocessor, a plurality of microprocessors, one or more microprocessors in conjunction with one digital signal processor core, or any other similar configuration.

The steps of the method or algorithm described in the embodiments of the present invention may be directly embedded in hardware, in a software module executed by a processor, or in a combination of the two. The software module may be stored in a random access memory (RAM), a flash memory, a read-only memory (ROM), an electrically programmable read-only memory (EPROM), an electrically erasable programmable read-only memory (EEPROM), a register, a hard disk, a removable magnetic disk, a compact disc read-only memory (CD-ROM), or any other form of storage medium known in the art. For example, the storage medium may be connected to the processor, so that the processor can read information from the storage medium and write information into the storage medium. Optionally, the storage medium may be integrated in the processor. The processor and the storage medium may be disposed in the ASIC, and the ASIC may be disposed in a user terminal. Optionally, the processor and the storage medium may be disposed in different components of the user terminal.

In one or more exemplary designs, the foregoing functions described in the embodiments of the present invention may be implemented in hardware, software, firmware, or any combination of the three. If implemented in software, the functions may be stored in a computer-readable medium, or transmitted over the computer-readable medium in the form of one or more instructions or code. The computer-readable medium includes a computer storage medium and a communication medium that facilitates transfer of a computer program from one place to another place. The storage medium may be an available medium accessible to a general-purpose or special-purpose computer. For example, such a computer-readable medium may include, but is not limited to, an RAM, an ROM, an EEPROM, a CD-ROM or other optical disc storage, magnetic disk storage or other magnetic storage devices, or any other medium capable of carrying or storing program code in the form of instructions or data structures or in other forms that can be read by a general-purpose or special-purpose computer or by a general-purpose or special-purpose processor. In addition, any connection may be properly defined as a computer-readable medium. For example, if software is transmitted from a website, a server or other remote resources through a coaxial cable, a fiber-optic cable, a twisted pair, or a digital subscriber line (DSL), or is transmitted in a wireless manner such as infrared wave, radio wave, or microwave, then the software is also contained in the defined computer-readable medium. The disk and the disc include a compact disk, a laser disc, an optical disc, a digital video disk (DVD), a floppy disk, and a blue-ray disc. The disk generally duplicates data magnetically, while the disc generally duplicates data optically through laser. A combination of the above may also be contained in the computer-readable medium.

The objectives, technical solutions, and advantages of the present invention are further described in detail in the above embodiments. It should be understood that the foregoing descriptions are merely specific implementations of the present invention, but are not intended to limit the scope of protection of the present invention. Any modification, equivalent replacement, improvement, or other made within the spirit and principle of the present invention shall fall within the scope of protection of the present invention.

What is claimed is:

1. A parking detection method based on visual difference, comprising:
obtaining a video frame of a predetermined monitoring area captured by one or more cameras in real time, and labeling the video frame corresponding to one or more cameras with time information of a current moment;
determining vehicle information of a to-be-detected vehicle in each video frame labeled with the time information through a predetermined convolutional neural network model;
determining feature point information of the to-be-detected vehicle in each video frame according to the vehicle information of the to-be-detected vehicle in each video frame;
calculating a position relationship between the to-be-detected vehicle in each video frame and respective corresponding camera according to the feature point information, and constructing current three-dimensional coordinates of the to-be-detected vehicle according to the position relationship; and
determining a parking status of the to-be-detected vehicle according to the current three-dimensional coordinates of the to-be-detected vehicle, wherein the step of determining the parking status of the to-be-detected vehicle according to the current three-dimensional coordinates of the to-be-detected vehicle further comprises:
determining whether the to-be-detected vehicle is blocked according to the current three-dimensional coordinates of the to-be-detected vehicle; and
determining the parking status of the to-be-detected vehicle when the to-be-detected vehicle is not blocked, the parking detection method further comprising:
determining a primary camera of the one or more cameras,
wherein the step of determining whether the to-be-detected vehicle is blocked according to the current three-dimensional coordinates of the to-be-detected vehicle comprises:
determining the time information based on the constructed current three-dimensional coordinates of the to-be-detected vehicle, and obtaining contrasted three-dimensional coordinates of the to-be-detected vehicle at a previous moment of the time information according to the time information;
for each feature point, determining whether a position of a current feature point of the to-be-detected vehicle in the current three-dimensional coordinates is consistent with a position of the current feature point of the to-be-detected vehicle in the contrasted three-dimensional coordinates;
when the position of the current feature point of the to-be-detected vehicle in the current three-dimensional coordinates is not consistent with the position of the current feature point of the to-be-detected vehicle in the contrasted three-dimensional coordinates, determining a current distance between the current feature point in the current three-dimensional coordinates and the primary camera according to a position of the current three-dimensional coordinates, and determining a contrasted distance between the current feature point in the contrasted three-dimensional coordinates and the primary camera according to a position of the contrasted three-dimensional coordinates; and
determining whether the to-be-detected vehicle is blocked according to the current distance and the contrasted distance.

2. The parking detection method according to claim 1, wherein the step of determining the vehicle information of the to-be-detected vehicle in each video frame labeled with the time information through the predetermined convolutional neural network model specifically comprises:
in each video frame labeled with the time information, based on each video frame, performing full-frame detection on a vehicle for a current video frame through the predetermined convolutional neural network model to obtain the vehicle information of the to-be-detected vehicle,
wherein the vehicle information comprises the feature point information of the vehicle.

3. The parking detection method according to claim 2, wherein the step of calculating the position relationship between the to-be-detected vehicle in each video frame and respective corresponding camera according to the feature point information comprises:

performing a comparison on identical feature points of the to-be-detected vehicle in all video frames through a principle of the visual difference based on the feature point information of the to-be-detected vehicle in all the video frames;

determining position information of each feature point in respective video frame after the comparison; and     calculating, based on the position information, a distance between each feature point and a camera capturing a video frame of respective feature point.

4. The parking detection method according to claim 3, wherein after the step of calculating, based on the position information, the distance between each feature point and the camera capturing the video frame of the respective feature point, the parking detection method comprises:

determining a feature point with a maximum distance and a feature point with a minimum distance based on all distances; and     the step of constructing the current three-dimensional coordinates of the to-be-detected vehicle according to the position relationship comprises:

constructing the current three-dimensional coordinates of the to-be-detected vehicle according to the feature point with the maximum distance and the feature point with the minimum distance.

5. The parking detection method according to claim 1, wherein the step of determining whether the to-be-detected vehicle is blocked according to the current distance and the contrasted distance comprises:

when the current distance is not smaller than the contrasted distance, determining that the to-be-detected vehicle is not blocked; and     when the current distance is smaller than the contrasted distance, determining that the to-be-detected vehicle is blocked.

6. A parking detection device based on visual difference, comprising:

an acquisition and labeling module, wherein the acquisition and labeling module is configured to obtain a video frame of a predetermined monitoring area captured by one or more cameras in real time, and label the video frame corresponding to one or more cameras with time information of a current moment;

a first determining module, wherein the first determining module is configured to determine vehicle information of a to-be-detected vehicle in each video frame labeled with the time information through a predetermined convolutional neural network model;

a second determining module, wherein the second determining module is configured to determine feature point information of the to-be-detected vehicle in each video frame according to the vehicle information of the to-be-detected vehicle in each video frame;

a calculation and construction module, wherein the calculation and construction module is configured to calculate a position relationship between the to-be-detected vehicle in each video frame and respective corresponding camera according to the feature point information, and construct current three-dimensional coordinates of the to-be-detected vehicle according to the position relationship; and     a third determining module, wherein the third determining module is configured to determine a parking status of the to-be-detected vehicle according to the current three-dimensional coordinates of the to-be-detected vehicle, wherein the third determining module further comprises:

a judgment unit, wherein the judgment unit is configured to determine whether the to-be-detected vehicle is blocked according to the current three-dimensional coordinates of the to-be-detected vehicle; and     a third determining unit, wherein the third determining unit is configured to determine the parking status of the to-be-detected vehicle when the to-be-detected vehicle is not blocked, the parking detection device further comprising:

a fourth determining module, wherein the fourth determining module is configured to determine any one camera as a primary camera, wherein the judgment unit is specifically configured to:

determine the time information based on the constructed current three-dimensional coordinates of the to-be-detected vehicle, and obtain contrasted three-dimensional coordinates of the to-be-detected vehicle at a previous moment of the time information according to the time information;

for each feature point, determine whether a position of a current feature point of the to-be-detected vehicle in the current three-dimensional coordinates is consistent with a position of the current feature point of the to-be-detected vehicle in the contrasted three-dimensional coordinates;

when the position of the current feature point of the to-be-detected vehicle in the current three-dimensional coordinates is not consistent with the position of the current feature point of the to-be-detected vehicle in the contrasted three-dimensional coordinates, determine a current distance between the current feature point in the current three-dimensional coordinates and the primary camera according to a position of the current three-dimensional coordinates, and determine a contrasted distance between the current feature point in the contrasted three-dimensional coordinates and the primary camera according to a position of the contrasted three-dimensional coordinates; and     determine whether the to-be-detected vehicle is blocked according to the current distance and the contrasted distance.

7. The parking detection device according to claim 6, wherein the first determining module is specifically configured to:

in each video frame labeled with the time information, based on each video frame, perform full-frame detection on a vehicle for a current video frame through the predetermined convolutional neural network model to obtain the vehicle information of the to-be-detected vehicle, wherein the vehicle information comprises the feature point information of the vehicle.

8. The parking detection device according to claim 7, wherein the calculation and construction module comprises:

a comparison unit, wherein the comparison unit is configured to perform a comparison on identical feature points of the to-be-detected vehicle in all video frames through a principle of the visual difference based on the feature point information of the to-be-detected vehicle in all the video frames;

a first determining unit, wherein the first determining unit is configured to determine position information of each feature point in respective video frame after the comparison; and a calculation unit, wherein the calculation unit is configured to calculate, based on the position information, a distance between each feature point and a camera capturing a video frame of respective feature point.

9. The parking detection device according to claim 8, wherein the calculation and construction module comprises:

a second determining unit, wherein the second determining unit is configured to determine a feature point with a maximum distance and a feature point with a minimum distance based on all distances; and a construction unit, wherein the construction unit is configured to construct the current three-dimensional coordinates of the to-be-detected vehicle according to the feature point with the maximum distance and the feature point with the minimum distance.

10. The parking detection device according to claim 6, wherein the judgment unit is specifically configured to:

when the current distance is not smaller than the contrasted distance, determine that the to-be-detected vehicle is not blocked; and when the current distance is smaller than the contrasted distance, determine that the to-be-detected vehicle is blocked.

\* \* \* \* \*